United States Patent
Smith

(10) Patent No.: US 11,584,182 B1
(45) Date of Patent: Feb. 21, 2023

(54) VEHICLE SUSPENSION TUNING SYSTEM AND METHOD

(71) Applicant: Justin Smith, Wittman, AZ (US)

(72) Inventor: Justin Smith, Wittman, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 371 days.

(21) Appl. No.: 16/809,752

(22) Filed: Mar. 5, 2020

Related U.S. Application Data

(60) Provisional application No. 62/814,103, filed on Mar. 5, 2019.

(51) Int. Cl.
| | | |
|---|---|---|
| *B60G 17/019* | (2006.01) | |
| *B60G 17/016* | (2006.01) | |
| *B60G 21/055* | (2006.01) | |
| *B60G 17/0165* | (2006.01) | |

(52) U.S. Cl.
CPC ..... *B60G 17/0162* (2013.01); *B60G 17/0165* (2013.01); *B60G 17/01908* (2013.01); *B60G 17/01933* (2013.01); *B60G 21/0553* (2013.01); *B60G 2204/62* (2013.01); *B60G 2400/10* (2013.01); *B60G 2400/204* (2013.01); *B60G 2400/41* (2013.01); *B60G 2400/822* (2013.01); *B60G 2500/10* (2013.01)

(58) Field of Classification Search
CPC ............ B60G 17/0162; B60G 17/0165; B60G 17/01908; B60G 17/01933; B60G 21/0553; B60G 2204/62; B60G 2400/10; B60G 2400/204; B60G 2400/41; B60G 2400/822; B60G 2500/10
USPC ........................................... 280/5.511, 5.515
See application file for complete search history.

(56) References Cited

U.S. PATENT DOCUMENTS

| | | | | |
|---|---|---|---|---|
| 5,367,459 | A * | 11/1994 | Shtarkman | B60G 17/018 280/93.5 |
| 8,229,642 | B2 * | 7/2012 | Post, II | B60W 40/064 701/48 |
| 10,507,825 | B2 * | 12/2019 | Gangwar | B60W 30/085 |
| 10,987,987 | B2 * | 4/2021 | Graus | B60G 17/01908 |
| 11,110,913 | B2 * | 9/2021 | Krosschell | B60W 10/10 |
| 2007/0182110 | A1 * | 8/2007 | Urababa | B60G 21/0555 280/5.506 |
| 2008/0183353 | A1 * | 7/2008 | Post | B60W 10/184 701/84 |
| 2009/0224493 | A1 * | 9/2009 | Buma | B60G 17/0162 280/5.511 |
| 2016/0059660 | A1 * | 3/2016 | Brady | B60G 17/08 701/37 |
| 2019/0241039 | A1 * | 8/2019 | Simula | B60G 21/0551 |

* cited by examiner

*Primary Examiner* — Toan C To
(74) *Attorney, Agent, or Firm* — Schmeiser, Olsen & Watts LLP

(57) ABSTRACT

Disclosed is an automatic vehicle suspension tuning system. The system has a control module to receive user input, an ECU with a processor and a memory, one or more road condition sensors, and one or more controllable suspension system components. The ECU controls the adjustments of the controllable suspension system component in response to user input to the control module as well as input from the road condition sensors during operation of the vehicle. A method of tuning a controllable suspension system component is also disclosed.

17 Claims, 2 Drawing Sheets

VEHICLE SUSPENSION TUNING SYSTEM AND METHOD

CROSS REFERENCE TO RELATED APPLICATION

This application claims priority to U.S. Provisional patent application to Justin Smith entitled "VEHICLE SUSPENSION TUNING SYSTEM AND METHOD," Ser. No. 62/814,103, filed Mar. 5, 2019, the disclosures of which are hereby incorporated entirely herein by reference.

BACKGROUND OF THE INVENTION

Technical Field

This invention relates generally to vehicle suspension systems and particularly to a system for automatically tuning a vehicle suspension system in response to user input to the system.

State of the Art

It is desirable to adjust the damping rate and/or the spring stiffness of a vehicle shock absorber to adapt the shock absorber to any of various road conditions. Many vehicle shock absorbers currently available are adjustable. For example, a user may adjust, by any of a variety of means, the damping rate and/or the spring stiffness of an adjustable shock absorber. Most adjustable shock absorbers available today require the user to make adjustments manually at a service garage or while the vehicle is otherwise not in use. Making these adjustments is commonly known as tuning the shock. Some adjustable shock absorbers are electronically controllable and are controlled by a factory installed electronics control unit, that is communicatively coupled to the controllable shock. However, none of these systems allows a user to control the damping rate and/or the spring stiffness of a controllable shock while the vehicle is in use.

It is also desirable to adjust the stiffness of a sway bar to adapt the sway bar to any of various road conditions. Many sway bars currently available are adjustable. For example, the lengths of the lever arms of a sway bar may be increased or reduced, such as by sliding the lever arms in or out from their attachment points or by detaching and reattaching the sway bar by different attachment points. Alternatively, a flat lever arm may be rotated from a stiff edge-on position to a more flexible flat-side-on position. A two-piece sway bar may be coupled together in an engaged position or decoupled to a disengaged position. Most adjustable sway bars available today require the user to make adjustments manually at a service garage or while the vehicle is otherwise not in use. Some adjustable sway bars are electronically controllable and are controlled by a factory installed electronics control unit, that is communicatively coupled to the controllable sway bar. However, none of these systems allows a user to control the sway bar stiffness of a controllable sway bar through a continuously variable range of settings while the vehicle is in use.

Accordingly, what is needed is an automatic suspension tuning system that allows the damping rate and/or the spring stiffness of a controllable shock and/or the sway bar stiffness of a controllable sway bar, to be adjusted, independently or in combination, while the vehicle is in use, in response to user input to the system.

SUMMARY OF THE INVENTION

The present invention relates to vehicle suspension systems and particularly to a system for automatically tuning a controllable vehicle suspension system component in response to user input to the system.

The system for automatically tuning a controllable vehicle suspension system component in response to user input comprises: a vehicle electronics control unit ("ECU") coupled to a vehicle; at least one controllable suspension system component mounted to the vehicle and coupled to the ECU; and a control module mounted to the vehicle and coupled to the ECU. The at least one controllable suspension system component may be any of a variety of suspension system components that are adjustable in response to a signal from an ECU, available today or in the future, such as a controllable shock absorber, a controllable sway bar, or the like, for example.

In embodiments, the ECU may further comprise a processor and a memory. The control module may be any suitable control module configured to receive user input from a user, that is coupled to the ECU, whereby the user may selectively enter desired settings for control of tuning a controllable suspension system component of the vehicle while the vehicle is in use. Signals received to the ECU may be stored in the memory. The processor may access, and process signals stored in, the memory to generate outgoing signals from the ECU to other components of the system.

In embodiments, a user input signal from the control module may be stored in the memory of the ECU. The ECU may be pre-programmed to generate a tuning signal. The ECU may then access and process the user input signal stored in the memory, thereby altering the program of the ECU to generate and send a customized tuning signal to the controllable suspension system component according to the user input signal, whereupon the controllable suspension system component is tuned in response to receiving the customized tuning signal.

In some embodiments, the system may further comprise at least one road condition sensor that is coupled to the vehicle, coupled to the ECU, and suitable for sensing any of a variety of road conditions, such as degree of shock compression or extension, degree of sway bar stiffness, vehicle speed, vehicle braking, vehicle acceleration, wheel traction slippage, steering angle, and the like. The road condition sensor may send road condition signals to the ECU, whereby the ECU may process the road condition signals to generate a tuning signal to be sent to the controllable suspension system component.

In some embodiments, the ECU may process a combination of road condition signals received from the road condition sensor and a user input signal from the control module to generate a tuning signal to send to the controllable suspension system component. In some embodiments, controllable suspension system component may further comprise a road condition sensor that senses the status of the controllable suspension system component, such as the degree of shock compression or extension or degree of sway bar stiffness, for example, and sends road condition signals to the ECU. In some embodiments, the controllable suspension system component may be a controllable shock, wherein the controllable shock further comprises a damping rate sensor or a spring stiffness sensor, or both a damping rate sensor and a spring stiffness sensor, for communicating spring stiffness and/or damping rate status to the ECU. In some embodiments, the controllable suspension system component may be a controllable sway bar, wherein the controllable sway bar further comprises a stiffness sensor, for communicating sway bar stiffness to the ECU. In some embodiments, the ECU sends data, including data related to the status of a controllable suspension system component, to the control module for display on the control module that may be viewed by the user.

In some embodiments, the controllable suspension system component may be adjusted to an adjustment setting or within a range of possible adjustment settings in accordance with parameters input to the control module by the user. In some embodiments, the controllable suspension system component may be adjusted to a setting that is continuously variable through a range of possible adjustment settings in accordance with parameters input to the control module by the user.

Also disclosed is a method of tuning a controllable suspension system component according to an embodiment, comprising: communicatively coupling an ECU to a control module; flashing the ECU; reprogramming the ECU; and tuning a controllable suspension system component that is communicatively coupled to the ECU in response to signals from the ECU after the ECU has been reprogrammed.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to vehicle suspension systems and particularly to a system for automatically tuning a controllable vehicle suspension system component in response to user input to the system.

Figure 1:
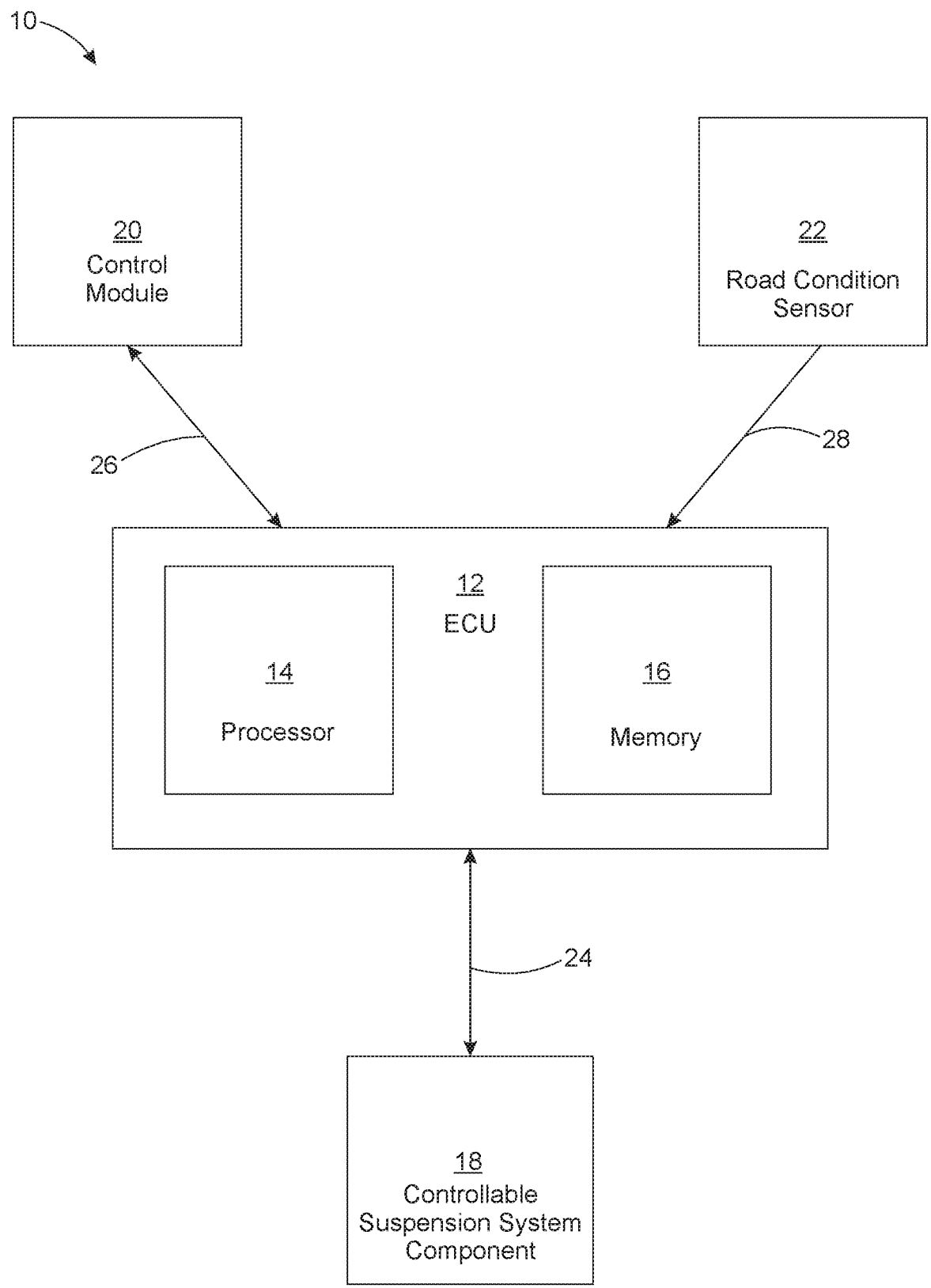
FIG. 1 is a block diagram of a vehicle suspension tuning system according to an embodiment.

Tuning a controllable vehicle suspension system component, as used herein, may refer to adjusting a shock absorber, such as adjusting the shock absorber's damping rate or adjusting the shock absorber's spring stiffness, or any combination thereof, or adjusting the stiffness of a sway bar, or adjusting any other controllable vehicle suspension system component. Referring to the drawings, FIG. 1, shows a vehicle suspension tuning system 10 according to an embodiment. The system 10 comprises: an ECU 12 coupled to a vehicle (not shown); at least one controllable vehicle suspension system component 18 mounted to the vehicle and coupled to the ECU 12, such as being coupled by communication link 24 that may be a wired or wireless coupling; and a control module 20 mounted to the vehicle and coupled to the ECU 12, such as being coupled by communication link 26 that may be a wired or wireless coupling.

In embodiments, the ECU 12 may be a factory-installed engine control unit or electronics control unit or the like, or it may be a control unit that is later-installed on a vehicle after-market. The ECU 12 may further comprise a processor 14 and a memory 16. The ECU may be pre-programmed to generate tuning signals to a controllable vehicle suspension system component 18. The control module 20 may be any suitable control module configured to receive user input from a user, such as a button, a switch, a control lever, a knob, a control panel, or an interactive display, or the like, that is communicatively coupled to the ECU via communication link 26, whereby the user may selectively enter desired settings for control of tuning a controllable suspension system component 18 of the vehicle. In some embodiments, the control module 20 may be coupled to the vehicle within a driver compartment of the vehicle.

In embodiments, the ECU 12 may be powered by the vehicle electronics system. In some embodiments, the ECU 12 may be powered by a self-contained power unit, such as a battery, a battery pack, or the like. Signals received to the ECU 12 may be stored in memory 16. Processor 14 may access, and process signals stored in, memory 16 to generate outgoing signals from the ECU 12 to other components of the system.

In embodiments, a user input signal from the control module 20 may be stored in the memory 16 of the ECU 12. The ECU 12 may then access and process the user input signal stored in memory 16, thereby altering the program of the ECU 12 to generate and send a customized tuning signal to the controllable suspension system component 18 according to the user input signal, whereupon the controllable suspension system component 18 is tuned in response to receiving the customized tuning signal.

In some embodiments, the system 10 may further comprise at least one road condition sensor 22 that is coupled to the vehicle and communicatively coupled to the ECU via communication link 28. The road condition sensor 22 may be any sensor that is suitable for sensing any of a variety of road conditions, such as degree of shock compression or extension, sway bar stiffness, vehicle speed, vehicle braking, vehicle acceleration, wheel traction slippage, steering angle, and the like. The road condition sensor 22 may send road condition signals to the ECU 12 via communication link 28, whereby the ECU 12 may process the road condition signals to generate a tuning signal to be sent to the controllable suspension system component 18 via communication link 24.

In some embodiments, the ECU 12 may process a combination of road condition signals received from the road condition sensor 22 and a user input signal from the control module 20 to generate a tuning signal to send to the controllable suspension system component 18. Communication links 24, 26 and 28 may be communication links of any appropriate medium, including but not limited to wireless, wire-line, optical fiber cable, RF, etc., or any suitable combination of the foregoing. In some embodiments, the controllable suspension system component 18 may further comprise a road condition sensor 22, such as a road condition sensor 22, that senses degree of shock compression or extension or degree of sway bar stiffness, for example, and sends road condition signals to the ECU 12 via communications link 24. In some embodiments, the controllable suspension system component 18 may further comprise a damping rate sensor or a spring stiffness sensor, or both a damping rate sensor and a spring stiffness sensor, for communicating spring stiffness and/or damping rate status to ECU 12 via communications link 24. In some embodiments, the controllable suspension system component 18 may further comprise a sway bar stiffness sensor, for communicating sway bar stiffness to ECU 12 via communications link 24. In some embodiments, ECU 12 sends data, including data related to the status of a controllable suspension system component 18, through communications link 26 to the ECU 20 for display on the control module 20 that may be viewed by the user.

In embodiments, the controllable suspension system component 18 may be any suitable adjustable or tunable vehicle shock absorber, available now or in the future, such as an air shock, a coil-over shock, wherein the coil-over shock may be an emulsion coil-over shock or a reservoir coil-over shock, or a bypass shock, or the like. In embodiments, the controllable suspension system component 18 may be any suitable adjustable or tunable sway bar or anti-roll bar, available now or in the future, such as a two-piece sway bar that may be engaged or disengaged, or any sway bar or anti-roll bar with an adjustable stiffness. In embodiments, the controllable suspension system component 18 may be any other suitable adjustable or tunable suspension system component, available now or in the future, that may be automatically adjusted in response to a tuning signal from an ECU 12. In embodiments, the status of the controllable suspension system component 18 may be adjustable and may be configured to self-adjust in response to receipt of a communication signal from an ECU 12.

In some embodiments, controllable suspension system component 18 may be adjusted to a tuned setting in accordance with parameters input to the ECU 20 by the user. For example, a tuned setting may be a damping rate setting, a spring stiffness setting, or a combination thereof, or a tuned shock setting may be a range of damping rate settings, spring stiffness settings, or combinations thereof that is a subset of available settings of a controllable shock 18. As another example, a tuned setting may be a sway bar stiffness setting or a range of sway bar stiffness settings that is a subset of available settings of a controllable sway bar. For example, in anticipation of a set of road conditions, the user may select a tuned setting that the controllable suspension system component 18 may be tuned to, such as a high range. Then, in anticipation of another set of road conditions, the user may select another tuned setting that the controllable suspension system component 18 may be tuned to, such as a low range.

In some embodiments, the controllable suspension system component 18 may be tuned in real time or near real time. For example, the ECU 12 may generate tuning signals in rapid succession in response to receiving road condition signals such that tuning signals are sent to the controllable suspension system component 18 by the ECU 12 in rapid succession to make further adjustments to the controllable suspension system component 18 according to the tuned setting chosen by the user. For example, multiple tuning signals may be sent in rapid succession to the controllable suspension system component 18 multiple times per second.

Figure 2:
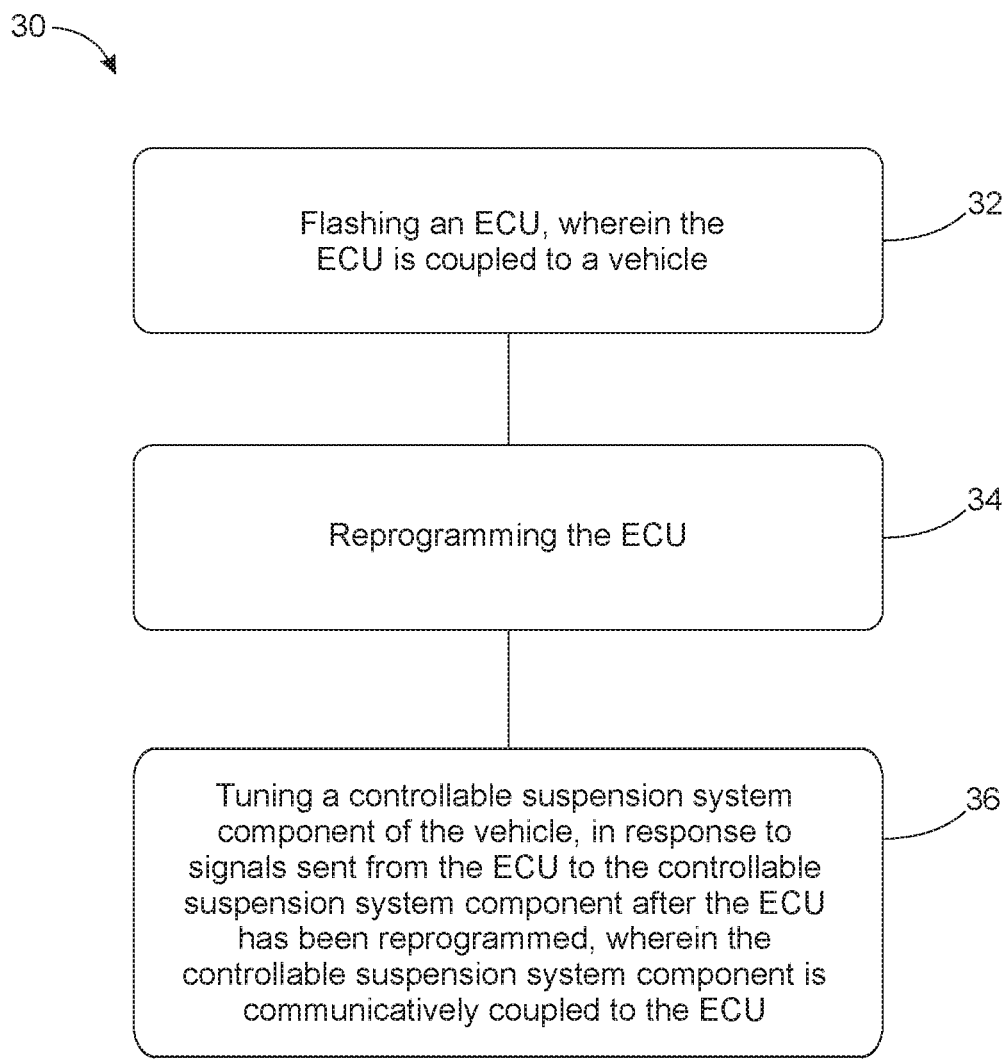
FIG. 2 is a block diagram of a method of tuning a controllable vehicle suspension system component according to an embodiment.

FIG. 2 depicts a method 30 of tuning a controllable suspension system component according to an embodiment, comprising: flashing an ECU, wherein the ECU is coupled to a vehicle [Step 32]; reprogramming the ECU [Step 34]; and tuning a controllable suspension system component of the vehicle, in response to signals sent from the ECU to the controllable suspension system component after the ECU has been reprogrammed, wherein the controllable suspension system component is communicatively coupled to the ECU [Step 36]. For example, a vehicle may have a factory-installed ECU that is communicatively coupled to a controllable shock absorber. However, the ECU may be preprogrammed to tune the controllable shock absorber only within a predetermined set of available factory adjustment settings and without user input. The method of the current invention comprises flashing such an ECU and reprogramming it such that it may tune the controllable shock absorber to a tuned shock setting in response to a user input signal from the control module.

In some embodiments of the method of tuning a controllable suspension system component the controllable suspension system component is tuned in response to user input to the control module. The control module may be coupled to the vehicle within a driver compartment of the vehicle and tuning may occur while the vehicle is in operation. In some embodiments of the method of tuning a controllable suspension system component the controllable suspension system component is tuned in response to signals received by the ECU from at least one road condition sensor that is communicatively coupled to the ECU.

In some embodiments of the method of tuning a controllable suspension system component, the at least one controllable suspension system component is a controllable shock, wherein the damping rate of the controllable shock is tuned in response to the user input to the control module. In some embodiments, the at least one controllable suspension system component is a controllable shock, wherein the spring stiffness of the controllable shock is tuned in response to the user input to the control module. In some embodiments, the at least one controllable suspension system component is a controllable sway bar, wherein the stiffness of the controllable sway bar is tuned in response to the user input to the control module.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A vehicle suspension tuning system comprising:
an ECU coupled to a vehicle;
at least one controllable suspension system component coupled to the vehicle and coupled to the ECU; and
a control module coupled to the vehicle and coupled to the ECU, wherein the ECU is programmed to receive a user input signal from the control module and send at least one tuning signal to the controllable suspension system component for tuning the controllable suspension system component to a tuned setting according to the user input signal in response to user input to the control module, and wherein the at least one controllable suspension system component is automatically adjusted in response to the at least one tuning signal.

2. The vehicle suspension tuning system of claim 1, wherein the at least one controllable suspension system component is a controllable shock, wherein the damping rate of the controllable shock is tuned in response to the user input to the control module.

3. The vehicle suspension tuning system of claim 1, wherein the at least one controllable suspension system component is a controllable shock, wherein the spring stiffness of the controllable shock is tuned in response to the user input to the control module.

4. The vehicle suspension tuning system of claim 1, wherein the at least one controllable suspension system component is a controllable sway bar, wherein the stiffness of the controllable sway bar is tuned in response to the user input to the control module.

5. The vehicle suspension tuning system of claim 1, further comprising at least one road condition sensor coupled to the ECU, wherein the ECU is further programmed to make near real time tuning adjustments to the at least one controllable suspension system component in response to signals received from the at least one road condition sensor.

6. The vehicle suspension tuning system of claim 1, wherein the ECU tunes the controllable suspension system component to a tuned setting, in response to signals received from the at least one road condition sensor, during operation of the vehicle.

7. The vehicle suspension tuning system of claim 1, wherein the at least one road condition sensor is selected from the group consisting of a shock compression sensor, a sway bar stiffness sensor, a vehicle speed sensor, a vehicle braking sensor, a vehicle acceleration sensor, a wheel traction slippage sensor, a steering angle sensor, and any combination thereof.

8. The vehicle suspension tuning system of claim 1, wherein the control module is disposed within a driver compartment of the vehicle, wherein the system is configured to be operational while the vehicle is in use.

9. The vehicle suspension tuning system of claim 1, wherein the at least one tuning signal are multiple tuning signals.

10. The vehicle suspension tuning system of claim 9, wherein the multiple tuning signals are sent in rapid succession multiple times per minute.

11. A method of tuning a controllable suspension system component comprising:

flashing an ECU, wherein the ECU is coupled to a vehicle;
reprogramming the ECU; and
tuning a controllable suspension system component of the vehicle, in response to signals sent from the ECU to the controllable suspension system component after the ECU has been reprogrammed, wherein the controllable suspension system component is coupled to the ECU, and wherein the controllable suspension system component is automatically adjusted in response to the signals.

12. The method of claim 11, wherein a control module is coupled to the vehicle and coupled to the ECU.

13. The method of claim 12 wherein the signals are sent from the ECU to the controllable suspension system component in response to user input to the control module.

14. The method of claim 13, wherein the control module is disposed within a driver compartment of the vehicle, wherein the controllable suspension system component is tuned to a tuned setting in response to user input to the control module during operation of the vehicle.

15. The method of claim 13, wherein the at least one controllable suspension system component is a controllable shock, wherein the damping rate of the controllable shock is tuned in response to the user input to the control module.

16. The method of claim 13, wherein the at least one controllable suspension system component is a controllable shock, wherein the spring stiffness of the controllable shock is tuned in response to the user input to the control module.

17. The method of claim 13, wherein the at least one controllable suspension system component is a controllable sway bar, wherein the stiffness of the controllable sway bar is tuned in response to the user input to the control module.

* * * * *